United States Patent
Watanabe

(10) Patent No.: US 11,391,414 B2
(45) Date of Patent: Jul. 19, 2022

(54) HIGH PRESSURE TANK AND MANUFACTURING METHOD THEREFOR

(71) Applicant: HONDA MOTOR CO., LTD., Tokyo (JP)

(72) Inventor: Hideo Watanabe, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 72 days.

(21) Appl. No.: 16/872,927

(22) Filed: May 12, 2020

(65) Prior Publication Data

US 2020/0363012 A1 Nov. 19, 2020

(30) Foreign Application Priority Data

May 16, 2019 (JP) .............................. JP2019-092548

(51) Int. Cl.
*F17C 1/06* (2006.01)
*B32B 37/02* (2006.01)

(52) U.S. Cl.
CPC ................ *F17C 1/06* (2013.01); *B32B 37/02* (2013.01); *F17C 2201/0109* (2013.01); *F17C 2203/0604* (2013.01); *F17C 2203/0617* (2013.01); *F17C 2203/0663* (2013.01); *F17C 2205/0311* (2013.01); *F17C 2270/0168* (2013.01); *F17C 2270/0184* (2013.01)

(58) Field of Classification Search
CPC ................ F17C 2205/0305; F17C 1/06; F17C 2201/0109; F17C 2203/0604; F17C 2203/0617; F17C 2203/0663; F17C 2205/0311; F17C 2270/0168; F17C 2270/0184; Y10T 403/366; B32B 37/02
See application file for complete search history.

(56) References Cited

U.S. PATENT DOCUMENTS

| | | | | |
|---|---|---|---|---|
| 1,982,852 A * | 12/1934 | Bergstrom | ................ | F16L 9/04 285/55 |
| 3,008,602 A * | 11/1961 | Tanker | .................. | F17C 13/002 220/601 |
| 7,100,262 B2 * | 9/2006 | Carter | .................. | B29C 70/086 156/172 |
| 7,287,663 B2 * | 10/2007 | Vandal | ...................... | F17C 1/02 220/4.12 |

(Continued)

FOREIGN PATENT DOCUMENTS

| CN | 108622562 A | 10/2018 |
|---|---|---|
| JP | 2008-101677 A | 5/2008 |
| JP | 6356172 B2 | 7/2018 |

OTHER PUBLICATIONS

Office Action including search report dated Jul. 13, 2021 issued over the corresponding Chinese Patent Application No. 202010413923.5 with the English translation thereof.

(Continued)

*Primary Examiner* — Shawn M Braden
(74) *Attorney, Agent, or Firm* — Carrier Blackman & Associates, P.C.; Joseph P. Carrier; Jeffrey T. Gedeon

(57) ABSTRACT

A high pressure tank is equipped with a liner, a reinforcing layer laminated on an outer surface of the liner, and a cap joined to the liner and having a flow path through which a gas is capable of flowing. The liner and the cap are joined to each other by screw-engagement, and a connecting member (plate-shaped members, annular member) is disposed so as to straddle over the liner and the cap.

7 Claims, 6 Drawing Sheets

(56) References Cited

U.S. PATENT DOCUMENTS

| | | | |
|---|---|---|---|
| 8,733,581 B1* | 5/2014 | Olson | F17C 13/002 |
| | | | 220/588 |
| 9,261,239 B2* | 2/2016 | Kanezaki | F17C 13/002 |
| 10,458,598 B2 | 10/2019 | Kanezaki | |
| 2004/0251007 A1* | 12/2004 | Toh | F17C 1/00 |
| | | | 165/157 |
| 2007/0017919 A1* | 1/2007 | Plattner | F17C 7/00 |
| | | | 220/581 |
| 2011/0101001 A1 | 5/2011 | Veenstra | |
| 2011/0303681 A1* | 12/2011 | Newhouse | F17C 1/08 |
| | | | 220/581 |
| 2013/0341337 A1* | 12/2013 | Patterson | F17C 1/16 |
| | | | 220/586 |
| 2014/0103051 A1* | 4/2014 | Kan | F17C 13/002 |
| | | | 220/587 |
| 2014/0224811 A1* | 8/2014 | Shubbar | F17C 13/04 |
| | | | 220/586 |
| 2015/0338024 A1* | 11/2015 | Iwata | F17C 13/00 |
| | | | 222/568 |
| 2016/0025266 A1* | 1/2016 | Leavitt | F17C 1/06 |
| | | | 206/0.6 |
| 2017/0122437 A1* | 5/2017 | Metzbower | F17C 1/16 |
| 2017/0268724 A1 | 9/2017 | Kanezaki et al. | |
| 2019/0049067 A1* | 2/2019 | Sawai | F17C 1/06 |

OTHER PUBLICATIONS

Office Action dated Jan. 5, 2021 issued over the corresponding Japanese Patent Application No. 2019-092548 with the English translation thereof.

* cited by examiner

HIGH PRESSURE TANK AND MANUFACTURING METHOD THEREFOR

CROSS-REFERENCE TO RELATED APPLICATION

This application is based upon and claims the benefit of priority from Japanese Patent Application No. 2019-092548 filed on May 16, 2019, the contents of which are incorporated herein by reference.

BACKGROUND OF THE INVENTION

Field of the Invention

The present invention relates to a high pressure tank for storing a gas and a method for manufacturing the same.

Description of the Related Art

A high pressure tank is installed in a fuel cell vehicle (fuel cell automotive vehicle) as a device for storing high pressure hydrogen gas. This type of high pressure tank, as disclosed in Japanese Patent No. 6356172 and Japanese Laid-Open Patent Publication No. 2008-101677, is equipped with a liner, a reinforcing layer that reinforces the liner, and a cap having a flow path through which a gas is capable of flowing, and which is joined to the liner. The reinforcing layer is constituted by winding a fiber reinforced resin around an outer surface of the liner.

SUMMARY OF THE INVENTION

During manufacturing of the high pressure tank disclosed in Japanese Patent No. 6356172, after having performed a joining step of screw-engaging the cap onto the liner, by supporting the cap and rotating the liner and the cap together, a reinforcing layer formation step of winding the fiber reinforced resin is performed. Since time is required to perform the reinforcing layer formation step, it has been sought to shorten the manufacturing time and to reduce manufacturing costs by increasing the speed at which the fiber reinforced resin is wound.

However, in the case that winding (filament winding) of the fiber reinforced resin is increased in speed, due to a high tensile force received at the time of rotation, the screw-engagement between the cap and the liner becomes loosened or tightened, and the fiber reinforced resin is wound around the cap which has been subjected to such loosening or tightening, leading to the possibility that the product quality of the high pressure tank could be degraded.

The present invention relates to the aforementioned technology of manufacturing a high pressure tank, and has the object of providing a high pressure tank and a method of manufacturing the same, in which a reinforcing layer can be suitably formed while preventing the liner and the cap from being subjected to loosening or tightening, even in the case that, for example, during manufacturing, a high tensile force caused by high speed rotation of a filament winding is applied to the liner and the cap.

In order to achieve the aforementioned object, a first aspect of the present invention is characterized by a high pressure tank including a liner, a reinforcing layer laminated on an outer surface of the liner, and a cap joined to the liner and having a flow path through which a gas is configured to flow, wherein the liner and the cap are joined to each other by screw-engagement, and a connecting member is disposed so as to straddle over the liner and the cap, and the connecting member restricts relative rotation between the liner and the cap.

Further, in order to achieve the aforementioned object, a second aspect of the present invention is characterized by a method of manufacturing a high pressure tank including a liner, a reinforcing layer laminated on an outer surface of the liner, and a cap joined to the liner and having a flow path through which a gas is configured to flow, the method of manufacturing the high pressure tank including a joining step of screw-engaging the liner and the cap, an arrangement step of, after the joining step, arranging a connecting member so as to straddle over the liner and the cap, and a reinforcing layer formation step of, after the arrangement step, rotating the liner and the cap while supporting the cap, and forming the reinforcing layer on an outer surface of the liner and an outer surface of the cap.

In the above-described high pressure tank and the method of manufacturing the same, the connecting member is arranged so as to straddle over the liner and the cap, whereby the screwed-engaged state of the liner and the cap can be stably maintained. Consequently, in the high pressure tank, it is possible to prevent the liner and the cap from being subjected to loosening or tightening, even if the cap is supported and rotated to wind the reinforcing layer when the reinforcing layer is formed. As a result, it becomes possible to suitably form the reinforcing layer on the outer surface of the liner and the cap.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Hereinafter, preferred embodiments of the present invention will be presented and described in detail below with reference to the accompanying drawings.

First Embodiment

Figure 1:
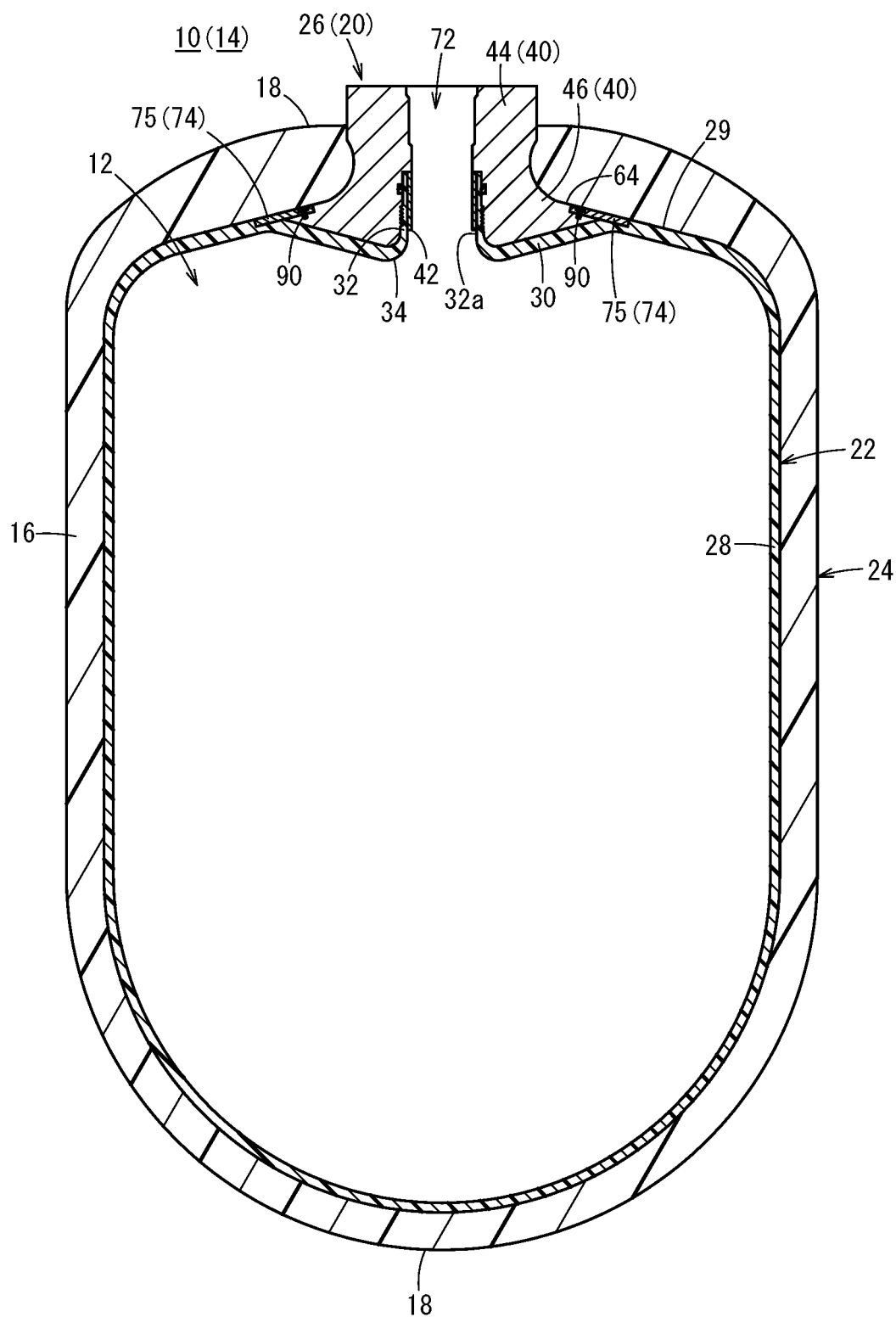
FIG. 1 is a side cross-sectional view showing an overall configuration of a high pressure tank according to a first embodiment of the present invention.

As shown in FIG. 1, a high pressure tank 10 according to a first embodiment of the present invention includes a storage space 12 in which a gas is compressed and stored. Such a high pressure tank 10 is applied to a fuel cell system 14, and stores hydrogen gas (a fuel gas, an anode gas) as the gas. For example, the high pressure tank 10 is installed in a non-illustrated fuel cell vehicle, and stores the hydrogen gas, which is supplied from a gas station, while on the other hand, supplies the hydrogen gas to a non-illustrated fuel cell stack when the vehicle is traveling or the like. Moreover, the high pressure tank 10 is not limited to being applied to the fuel cell system 14, and naturally is capable of storing a gas other than hydrogen gas.

The high pressure tank 10 includes a cylindrical body portion 16 and substantially hemispherical closed portions 18 that close both ends of the body portion 16, and the storage space 12 on the inner side thereof is formed to have an appropriate volume. On the closed portion 18 on one end side of the high pressure tank 10, a port 20 is provided that communicates between the storage space 12 and the exterior of the high pressure tank 10, and serves to enable connection to other members (pipes and valves) of the fuel cell system 14.

The high pressure tank 10 is configured to include a liner 22 having the storage space 12 on an inner side thereof, a reinforcing layer 24 that covers an outer surface of the liner 22, and a cap 26 that constitutes the port 20 and allows the hydrogen gas to flow therethrough.

The liner 22 constitutes an inner layer (skeletal structure) of the high pressure tank 10. The liner 22 includes a main body portion 28, a recessed portion 30 that is recessed toward the inner side on one end of the main body portion 28, and a cylindrical fixing portion 32 for fixing the cap 26. The main body portion 28, the recessed portion 30, and the cylindrical fixing portion 32 are formed sequentially by a predetermined resin material (for example, a polyamide resin). Moreover, the liner 22 may have a structure in which a plurality of resin layers are laminated. Further, in the illustrated example, the main body portion 28 is configured consecutively, however, for example, a configuration may also be provided in which two members are joined at intermediate portions in the axial direction of the body portion 16, and caps 26 are provided at two locations.

The reinforcing layer 24 is directly laminated on an outer surface 29 of the main body portion 28. The constituent location of the body portion 16 on the main body portion 28 extends linearly in the axial direction, whereas the constituent locations of the closed portions 18 on the main body portion 28 are smoothly curved from the constituent location of the body portion 16 toward the inner side in the radial direction.

Figure 2:
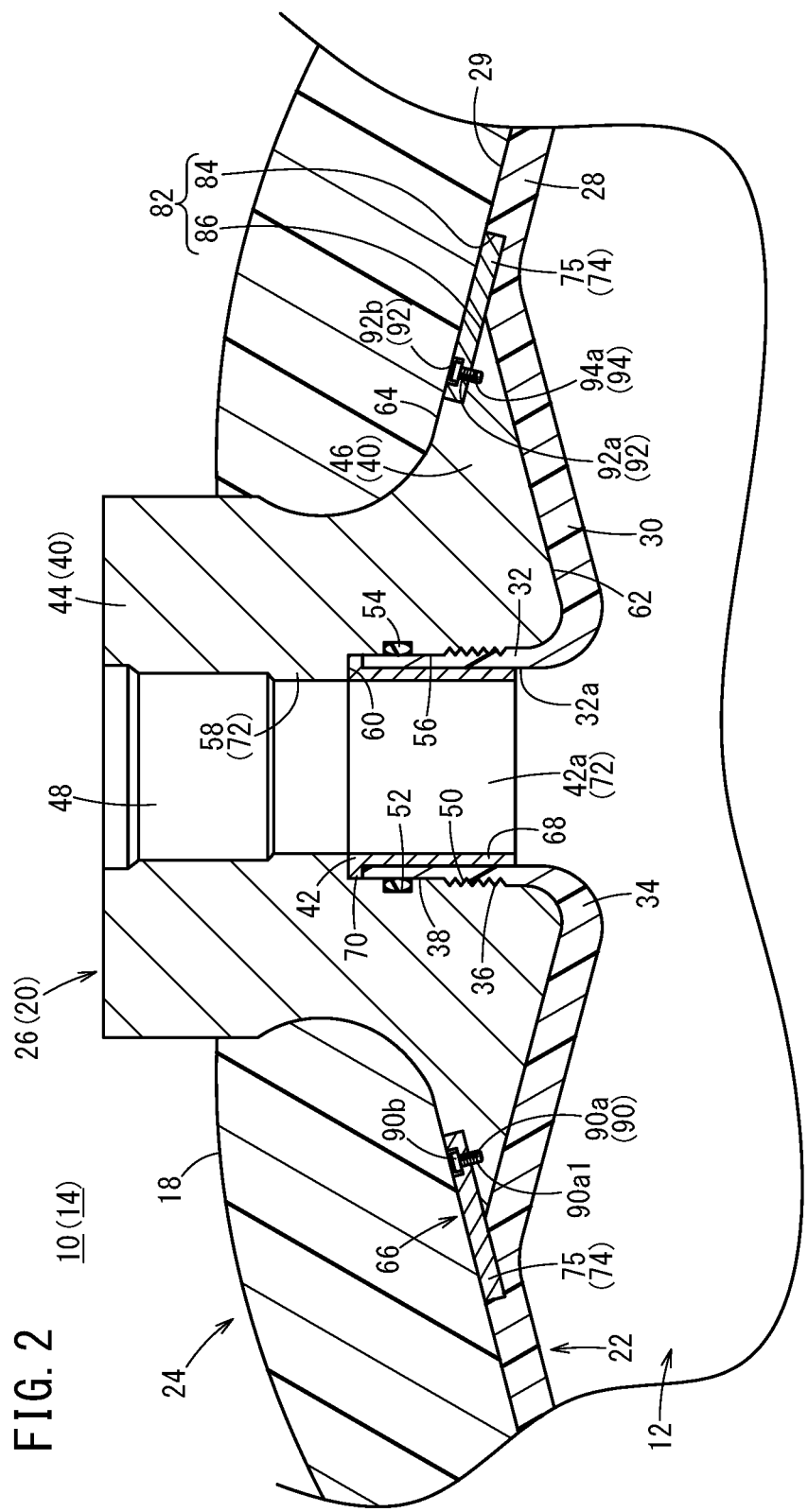
FIG. 2 is an enlarged side cross-sectional view showing one end of the high pressure tank.

As shown in FIGS. 1 and 2, the recessed portion 30 constitutes a portion where the cap 26 is mounted on the main body portion 28, and is formed in a shape that conforms to the other end side of the cap 26. More specifically, the recessed portion 30 is formed with a tapered shape that is continuous with an annular shaped one end edge of the main body portion 28, and is gently inclined inwardly in a radial direction, and toward the other end side of the main body portion 28.

The cylindrical fixing portion 32 is disposed at the center of the recessed portion 30, and projects from the recessed portion 30 toward the outer side (one end side) in the axial direction. A communication hole 32a, which communicates with the storage space 12 of the main body portion 28 (liner 22) and is formed with a predetermined inner diameter, is provided inside the cylindrical fixing portion 32. Further, the recessed portion 30 and the cylindrical fixing portion 32 are smoothly continuous with one another via a curved connecting portion 34. A male screw portion 36 is formed on the other end side of an outer circumferential wall of the cylindrical fixing portion 32. On the other hand, the one end side of the cylindrical fixing portion 32 is a smooth surface 38 without the male screw portion 36 being formed thereon.

The reinforcing layer 24 constitutes an outer layer of the high pressure tank 10, and covers the entirety of the main body portion 28 of the liner 22, and a portion of the cap 26 that is attached to the liner 22. As the reinforcing layer 24, for example, preferably a carbon fiber reinforced resin is applied thereto. The reinforcing layer 24 can be formed by carrying out filament winding. In carrying out filament winding, the fiber reinforced resin is wound around the outer surface 29 of the liner 22 and the outer surface of the cap 26, while a base material resin is impregnated into the reinforcing fibers during a process of delivering the same. Moreover, in carrying out filament winding, it is also possible to wind the fiber reinforced resin which has been impregnated with the base material resin prior to delivery of the reinforcing fibers. Carbon fibers can be applied to the reinforcing fibers, and as the base material resin, an epoxy resin can be applied thereto.

As described above, the cap 26 constitutes the port 20 for the hydrogen gas in the closed portion 18 on the one end side of the high pressure tank 10. The cap 26 includes a first member 40 disposed on the outer side of the liner 22 (the recessed portion 30, the cylindrical fixing portion 32), and a second member 42 disposed on the inner side of the liner 22 (the cylindrical fixing portion 32). The first and second members 40 and 42 are constituted from the same metal material or from different metal materials.

The first member 40 of the cap 26 includes a cap main body 44, and a flange portion 46 that protrudes outwardly in the radial direction at the other end of the cap main body 44. Further, a through hole 48 is formed in an axial center (center) of the cap main body 44 so as to penetrate through both ends of the cap main body 44. The cylindrical fixing portion 32 of the liner 22 is inserted into the through hole 48.

Figure 3:
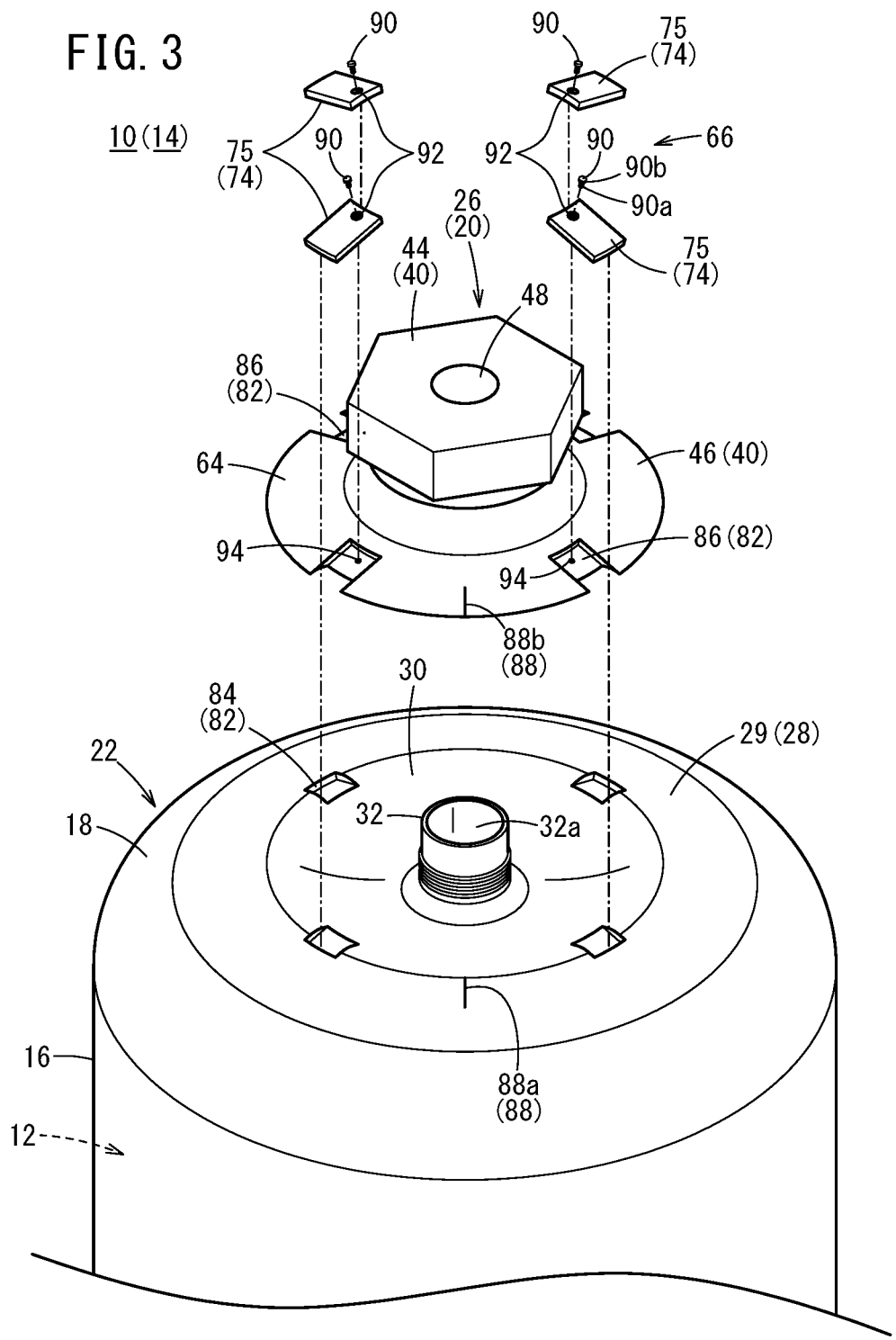
FIG. 3 is an exploded perspective view showing one end of the high pressure tank.

The cap main body 44 is formed to be considerably thicker than the thickness of the cylindrical fixing portion 32. The outer shape of the cap main body 44 is set to an appropriate shape which enables attachment thereto of another member (a mouth valve) of the fuel cell system 14. For example, as shown in FIG. 3, the outer shape of the cylindrical fixing portion 32 has a portion that is narrowed centrally in the axial direction, and a portion that exhibits a hexagonal shape (polygonal shape) on the one end side thereof. The other end (flange portion 46) side of the outer shape of the cap main body 44 is a covered portion over which the reinforcing layer 24 is laminated, whereas the one end (projecting end) side of the outer shape of the cap main body 44 is a portion that is exposed from the reinforcing layer 24.

A female screw portion 50 corresponding to the male screw portion 36 of the liner 22 is provided on the other end (flange portion 46) side of an inner wall part that constitutes the through hole 48 in the cap main body 44. Furthermore, an annular groove 52 is formed along the circumferential direction at a position of the inner wall portion adjacent to the female screw portion 50. An O-ring 54 (sealing member) is accommodated in the annular groove 52. The O-ring 54 forms a seal between the outer circumferential surface (smooth surface 38) of the cylindrical fixing portion 32 of the liner 22 and the bottom surface of the annular groove 52, and maintains a state of airtightness between the liner 22 and the cap 26. Further, the inner wall part that constitutes the through hole 48 includes a large diameter portion 56 having the female screw portion 50 and the annular groove 52, and a small diameter portion 58 formed on the one end side of the large diameter portion 56 and which is smaller than the large diameter portion 56. A stepped portion 60 is provided between the large diameter portion 56 and the small diameter portion 58.

On the other hand, the flange portion 46 of the first member 40 exhibits a disk shape as a whole, by protruding radially outward from the other end of the cap main body 44 and being formed in an annular shape in the circumferential direction. As viewed in cross-section from the side, the wall thickness of the flange portion 46 is larger in thickness on an inner side in the radial direction (at the portion contiguous with the cap main body 44), whereas the wall thickness thereof is smaller in thickness on the outer side in the radial direction.

More specifically, a surface (opposing surface 62) of the cap main body 44 and the flange portion 46 on the other end side facing toward the recessed portion 30 of the liner 22 is formed as an inclined surface capable of being placed in surface contact with the outer surface of the recessed portion 30. Further, in an assembled state of the liner 22 and the cap 26, one end surface (outer surface 64) of the flange portion 46 on a side opposite to the opposing surface 62 is configured to be connected to lie flush with the outer surface 29 of the main body portion 28. The opposing surface 62 and the outer surface 64 intersect at a predetermined angle on the outer edge of the flange portion 46. In addition, a rotation restricting mechanism 66, to be described later, which restricts relative rotation between the liner 22 and the cap 26, is provided on the outer edge of the flange portion 46.

The second member 42 of the cap 26, due to being arranged on the inner side of the cylindrical fixing portion 32 of the liner 22, functions as a collar that supports the cylindrical fixing portion 32 from the inside. Stated otherwise, in the present embodiment, an inner circumferential surface of the first member 40 (cap main body 44), and an outer circumferential surface of the second member 42 sandwich and hold the cylindrical fixing portion 32 of the liner 22, and by action of the second member 42, serve a function of pressing the outer circumferential surface of the cylindrical fixing portion 32. It should be noted that the cap 26 need not necessarily be equipped with the second member 42.

The second member 42 includes a cylindrical portion 68 that has a passage hole 42a and which is arranged in the interior of the communication hole 32a of the cylindrical fixing portion 32, and an annular convex portion 70 that projects radially outward at one end of the cylindrical portion 68 and goes around the cylindrical portion 68 in an annular shape. The cylindrical portion 68 has a length from the one end of the cylindrical fixing portion 32 that corresponds to the male screw portion 36, and is in contact with the inner surface of the cylindrical fixing portion 32. In a state in which the liner 22 and the cap 26 are assembled together, the passage hole 42a of the cylindrical portion 68 is connected to the communication hole 32a (the storage space 12) of the liner 22 and to the small diameter portion 58 of the cap 26, and the hydrogen gas flows into the high pressure tank 10, while in addition, a flow path 72 is constructed in the space of the mouth valve.

On the other hand, the annular convex portion 70 is capable of being caught on a projecting end of the cylindrical fixing portion 32, so that accompanying the first member 40 being assembled with respect to the liner 22, the annular convex portion 70 is sandwiched between the projecting end of the cylindrical fixing portion 32 and the stepped portion 60 of the first member 40. Owing to this feature, rattling of the second member 42 is prevented.

Next, a description will be given concerning the rotation restricting mechanism 66 that is provided on the high pressure tank 10 according to the present embodiment. The rotation restricting mechanism 66 restricts relative rotation between the liner 22 and the cap 26 by one or more connecting members 74 being disposed so as to straddle over the liner 22 and the cap 26.

Figure 4:
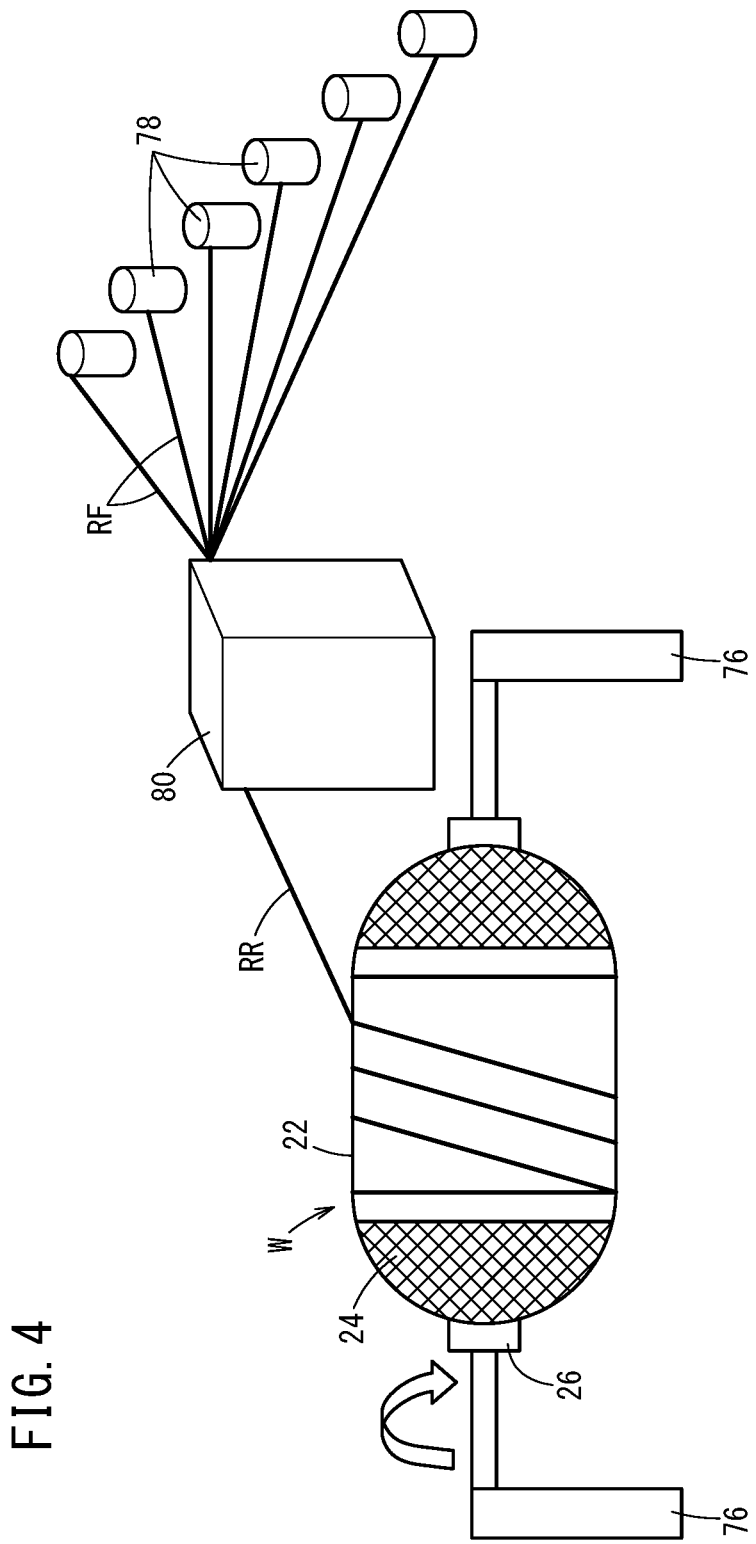
FIG. 4 is an explanatory view schematically showing a state of implementing a reinforcing layer formation step at a time of manufacturing the high pressure tank.

As discussed previously, in an assembled state of the liner 22 and the cap 26 (hereinafter, collectively referred to as a workpiece W), the high pressure tank 10 forms the reinforcing layer 24 by winding a fiber reinforced resin RR around the outer surface of the workpiece W. During formation of the reinforcing layer 24, as shown in FIG. 4, both ends of the workpiece W are supported by a pair of rotation jigs 76, and the rotation jigs 76 are rotated by a non-illustrated rotation mechanism. More specifically, one of the pair of rotation jigs 76 supports the cap 26 provided on the one end of the liner 22, and by a rotational force being applied to the cap 26, the liner 22 and the cap 26 are collectively rotated. In addition, during formation of the reinforcing layer 24, reinforcing fibers RF are fed from one or more creels 78, and are impregnated with the base material resin in an impregnation unit 80 to form the fiber reinforced resin RR, whereupon the fiber reinforced resin RR is wound onto the rotating workpiece W.

In this instance, in a structure in which the liner 22 and the cap 26 are screw-engaged, supposing a case in which the rotation restricting mechanism 66 were not provided, if the pair of rotation jigs 76 are rotated at high speed in order to shorten the time required for laminating, a torque of a high tensile force is applied to the cap 26, leading to the possibility of loosening or tightening occurring between the liner 22 and the cap 26. During formation of the reinforcing layer 24, the rotation restricting mechanism 66 restricts the relative rotation between the liner 22 and the cap 26, thereby preventing the liner 22 and the cap 26 from being subjected to loosening or tightening.

More specifically, as shown in FIG. 3, a plurality of the connecting members 74 (plate-shaped members 75) are arranged so as to straddle over the main body portion 28 of the liner 22 and the flange portion 46 of the cap 26, whereby relative rotation between the liner 22 and the cap 26 is limited. The plurality of plate-shaped members 75 are provided in the form of rectangular shaped blocks (plate bodies), and possess a rigidity which is capable of restricting the relative rotation between the liner 22 and the cap 26. The constituent material of the connecting members 74 is not particularly limited, and either a resin material or a metal material may be applied thereto.

In the present embodiment, the plurality of (four) plate-shaped members 75 are disposed at equal intervals along the boundary (circumferential direction) of a perfect circular shape between the main body portion 28 and the flange portion 46. In addition, the rotation restricting mechanism 66 includes a plurality of (four) placement recesses 82 provided in each of the main body portion 28 and the flange portion 46 for placement therein of the respective plate-shaped members 75. It should be noted that the number of the plate-shaped members 75 and the placement recesses 82 is not particularly limited, and may be any number greater than or equal to one.

The respective placement recesses 82 are constituted by liner side recesses 84 which are formed in the outer surface 29 of the liner 22 (main body portion 28), and cap side recesses 86 which are formed in the outer surface 64 of the cap 26 (the flange portion 46 of the first member 40). The respective liner side recesses 84 and the respective cap side recesses 86 are cut out in the thickness direction without penetrating through the main body portion 28 and the flange portion 46, whereby each of them exhibits a rectangular space.

The width and depth of the liner side recesses 84 and the width and depth of the cap side recesses 86 coincide mutually with each other. The length in the longitudinal direction of the liner side recesses 84 and the cap side recesses 86 is not particularly limited, insofar as, when in a state of being in communication with each other, the length is equal to or longer than the length in the longitudinal direction of the plate-shaped members 75. The liner side recesses 84 and the cap side recesses 86 may be set to have the same length or different lengths.

The liner side recesses 84 and the cap side recesses 86 form the placement recesses 82 in a state in which the cap 26 is screw-engaged with the liner 22 and the phases thereof in the circumferential direction coincide with each other. A position indicating member 88 (a recess, a convex portion, a printed portion, or the like) which indicates a completed position of screw-engagement may be formed on the outer surface 29 of the main body portion 28 and the outer surface 64 of the flange portion 46. For example, the position indicating member 88 is made up from a liner side display member 88a and a cap side display member 88b, which are provided at positions spaced apart to a certain extent from the liner side recesses 84 and the cap side recesses 86 along the circumferential direction (for example, at intermediate positions between adjacent ones of the placement recesses 82). Moreover, if the position indicating member 88 is provided on either one of the liner 22 or the cap 26, it is capable of indicating the relative positioning between the liner side recesses 84 and the cap side recesses 86.

It is preferable that the width of the respective connecting members 74 (plate-shaped members 75) in a direction perpendicular to the direction of extension thereof coincide with that of the placement recesses 82, together with the thickness thereof being set to be less than or equal to the depth of the placement recesses 82. In accordance with this feature, when the connecting members 74 are placed in the placement recesses 82, the connecting members 74 do not project out from the placement recesses 82, and the reinforcing layer 24 can be laminated in a stable manner on the outer surface 29 of the liner 22 and the outer surface 64 of the cap 26.

Further, the connecting members 74 (plate-shaped members 75) have holes 92 in one end portion into which engagement members 90 are capable of being inserted and engaged therewith. The holes 92 face toward holes 94 provided in the cap 26 in a state in which the connecting members 74 are arranged in the placement recesses 82. As shown in FIGS. 2 and 3, the holes 92 penetrate in a thickness direction through the connecting members 74, and include base holes 92a, and latching recesses 92b provided on one surface (the outer surface 64) side of the connecting members 74 and which communicate with the base holes 92a. The latching recesses 92b are formed to be larger in diameter than the base holes 92a.

The engagement members 90 engage with the cap 26 and the connecting members 74 by being inserted into the flange portion 46 from the outer side of the connecting members 74. The engagement members 90 include shaft portions 90a inserted into the base holes 92a of the connecting members 74 and the holes 94 of the flange portion 46, and head portions 90b connected to one end of the shaft portions 90a and arranged in the latching recesses 92b of the connecting members 74. Screw threads 90a1 may be formed on outer circumferential surfaces of the shaft portions 90a, whereas screw grooves 94a corresponding to the screw threads 90a1 of the shaft portions 90a may be formed on inner circumferential surfaces of the holes 94.

The head portions 90b are placed in contact with bottom parts of the latching recesses 92b and engage with the connecting members 74, thereby preventing the connecting members 74 from falling off. The depth of the latching recesses 92b of the connecting members 74 coincides with the thickness of the head portions 90b, and the head portions 90b are accommodated therein so as not to project out from the latching recesses 92b. Further, accompanying formation of the reinforcing layer 24, the head portions 90b are pressed from the reinforcing layer 24 toward the inner side (more deeply in the direction in which the engagement members 90 are inserted).

Moreover, the engagement members 90 that fix the connecting members 74 and the cap 26 are not particularly limited, and for example, instead of structures (screws) that are screw-engaged, pins or the like that are simply inserted into the holes 92 and the holes 94 may be adopted. If the connecting members 74 are fitted into the placement recesses 82 with an appropriate frictional force, then since the connecting members 74 are prevented from falling off, the engagement members 90 need not necessarily be provided.

The high pressure tank 10 according to the present embodiment is basically configured in the manner described above. Next, a description will be given below concerning a method of manufacturing the high pressure tank 10.

Figure 5:
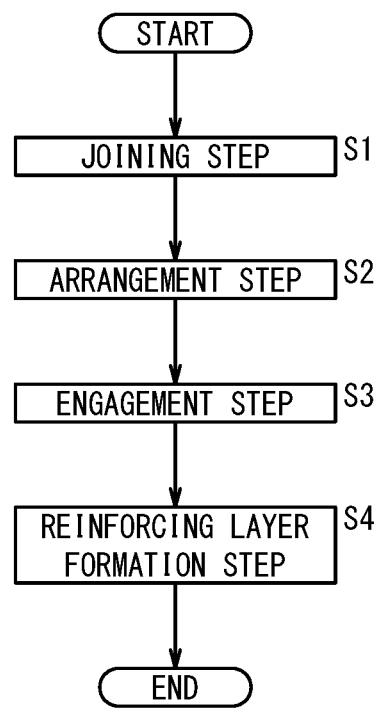
FIG. 5 is a flowchart showing steps performed during manufacturing of the reinforcing layer of the high pressure tank.

During manufacturing of the high pressure tank 10, as shown in FIG. 5, a joining step (step S1), an arrangement step (step S2), an engagement step (step S3), and a reinforcing layer formation step (step S4) are sequentially performed.

In the joining step, the liner 22 and the cap 26, which are individually provided (molded), are assembled by way of screw-engagement. More specifically, in the joining step, an operator or a manufacturing apparatus inserts the second member 42 of the cap 26 into the communication hole 32a of the cylindrical fixing portion 32 of the liner 22, together with inserting the cylindrical fixing portion 32 into the through hole 48 of the first member 40. In addition, the liner 22 and the cap 26 are screw-engaged by rotating the first member 40 relative to the cylindrical fixing portion 32.

When rotation of the cap 26 with respect to the liner 22 is stopped, screw-engagement of the liner 22 and the cap 26 is completed. In the screw-engaged state, the projecting end of the cylindrical fixing portion 32 of the liner 22 and the stepped portion 60 of the first member 40 sandwich the annular convex portion 70 of the second member 42. In such a screw-engaged state, the liner side display member 88a provided on the main body portion 28 of the liner 22 and the cap side display member 88b provided on the flange portion 46 of the first member 40 coincide with each other. Further, in the screw-engaged state, the phases of the respective liner side recesses 84 and the respective cap side recesses 86 coincide with each other, and the plurality of placement recesses 82 are formed between the liner 22 and the cap 26, continuously in the radial direction. Provisionally, supposing a case in which the liner side recesses 84 and the cap side recesses 86 are misaligned, it can be determined that formation of the liner 22 or the cap 26 is defectively formed.

Next, in the arrangement step, as shown in FIG. 3, the connecting members 74 (plate-shaped members 75) are inserted into the respective placement recesses 82 that were formed by the engagement step. In addition, the engagement step is executed in a state in which the connecting members 74 are inserted into the placement recesses 82. In the engagement step, the engagement members 90 are inserted into the holes 92 of the connecting members 74 and the holes 94 of the cap 26, and by screwing the engagement members 90 therein, screw-engagement of the engagement members 90 and the cap 26 is carried out. Consequently, the connecting members 74 and the cap 26 are firmly engaged (fastened) with each other, and the connecting members 74 are prevented from falling off from the placement recesses 82.

In the reinforcing layer formation step, as shown in FIG. 4, the workpiece W on which the liner 22 and the cap 26 are assembled is set between the pair of rotation jigs 76. At this time, one of the rotation jigs 76 supports one end of the workpiece W by fixing the through hole 48 and the outer surface, etc., of the cap 26 (cap main body 44).

Then, after the workpiece W has been set, the pair of rotation jigs 76 are rotated by the rotation mechanism. Consequently, the entirety of the workpiece W is rotated axially about the rotation jigs 76, and during rotation thereof, the reinforcing fibers RF are fed out from the creels 78, and the fiber reinforced resin RR, which has been impregnated with the base material resin in the impregnation unit 80, is wound around the outer surface of the workpiece W.

When the workpiece W is rotated, as shown in FIG. 2, the connecting members 74 are arranged so as to straddle between the liner 22 and the cap 26, whereby relative rotation between the liner 22 and the cap 26 is restricted. More specifically, the rotational force is smoothly transmitted to the liner 22 from the cap 26 that is supported by the rotating jigs 76, and even if a high tensile force is applied from the fiber reinforced resin RR of the workpiece W, the screw-engaged state of the liner 22 and the cap 26 is not subjected to loosening or tightening.

The high pressure tank 10 manufactured by the steps described above is formed in a state of being neatly wound, in which bulging out or sinking in or the like of the reinforcing layer 24 on the outer surface 29 of the liner 22 (main body portion 28) and the outer surface 64 of the cap 26 (flange portion 46) does not occur. Stated otherwise, without the connecting members 74 projecting out from the placement recesses 82, and by the outer surface 29 of the main body portion 28 and the outer surface 64 of the flange portion 46 being connected to lie flush with each other, the fiber reinforced resin RR continues smoothly at locations where the connecting members 74 are arranged. Accordingly, the high pressure tank 10 which is of high quality can be manufactured even after having carried out high-speed winding in a shortened time period in a laminating step.

The present invention is not limited to the above-described embodiments, and various modifications can be adopted in accordance with the essence and scope of the present invention. For example, the shape of the rotation restricting mechanism 66 (the connecting members 74, the liner side recesses 84, the cap side recesses 86) is not limited to being of a rectangular shape, insofar as relative rotation between the liner 22 and the cap 26 can be restricted thereby, and various shapes such as rounded bar shapes, tubular shapes, hook shapes or the like may be adopted.

Second Embodiment

Figure 6:
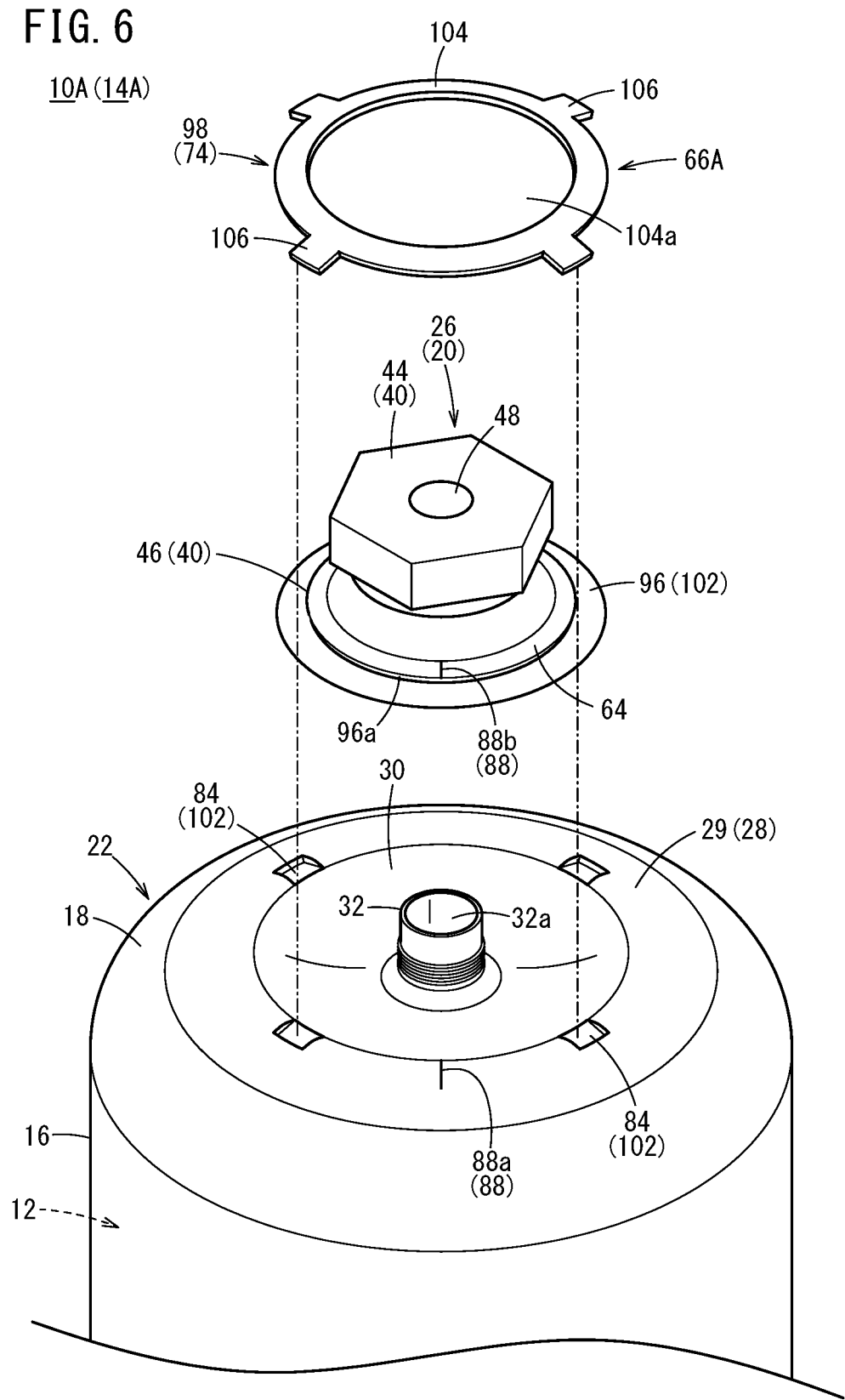
FIG. 6 is an exploded perspective view showing one end of a high pressure tank according to a second embodiment.

Next, a description will be given with reference to FIG. 6 concerning a high pressure tank 10A according to a second embodiment of the present invention. In the following description, elements having the same configurations or functions as those of the above-described embodiment are designated by the same reference numerals, and detailed description of such features is omitted.

The high pressure tank 10A differs from the high pressure tank 10 described above in that, as a rotation restricting mechanism 66A, an annular notch 96 is provided on the outer surface 64 of the cap 26 (first member 40), and an annular member 98, which is capable of being arranged in the notch 96 and in the liner side recesses 84 of the liner 22, is arranged therein. Stated otherwise, the annular member 98 constitutes the connecting member 74 of the rotation restricting mechanism 66A.

The notch 96 extends in the flange portion 46 of the first member 40 at a predetermined depth along the circumferential direction, thereby constituting a single cap side recess 86. A stepped shape 96a is formed by the notch 96 on the outer circumference of the flange portion 46. The annular member 98 is externally fitted into the flange portion 46 by being arranged in the stepped shape 96a. Further, the notch 96 and the liner side recesses 84 communicate with each other in the assembled state of the liner 22 and the cap 26, to thereby form spaces (placement recesses 102) having a shape that coincides with that of the annular member 98.

The annular member 98 is formed in a plate shape having a predetermined thickness. The annular member 98 includes a circular shaped ring member 104 that can be inserted into the notch 96, and a plurality of (four as shown in FIG. 6) protruding pieces 106 that protrude radially outward (radially) from the outer edge of the ring member 104. The ring member 104 includes a central hole 104a through which the cap main body 44 can be passed from one end side of the cap 26 toward the flange portion 46, and an inner edge thereof is fitted into the stepped shape 96a. Further, the plurality of protruding pieces 106 are disposed mutually at equal intervals, and are formed in shapes (rectangular shapes) that coincide with the liner side recesses 84.

With the above-described high pressure tank 10A as well, relative rotation between the liner 22 and the cap 26 can be restricted by disposing the annular member 98 so as to straddle over the liner 22 and the cap 26. In particular, since the annular member 98 is constituted by one individual member, the number of component parts can be reduced, operational efficiency can be improved, and manufacturing costs can be reduced.

Moreover, it is a matter of course that the shape of the annular member 98 is not particularly limited, and may be formed not only in a plate shape in the manner described above, but also in a block shape or the like. The ring member 104 may be positioned on an outer side (on the side of the main body portion 28 of the liner 22), whereas the protruding pieces 106 may be positioned on an inner side (on the side of the flange portion 46 of the cap 26). In this case, the placement recesses 102 may be appropriately formed on the liner 22 and the cap 26 in accordance with the shape of the annular member 98. Further, the annular member 98 may be engaged by the engagement members 90 (see FIG. 3).

A description will be given below concerning the technical concepts and effects that can be grasped from the above-described embodiments.

The high pressure tank 10 or 10A according to the present invention is equipped with the liner 22, the reinforcing layer 24 laminated on the outer surface 29 of the liner 22, and the cap 26 that is joined to the liner 22 and has the flow path 72 through which a gas is configured to flow. The liner 22 and the cap 26 are joined to each other by screw-engagement, and the connecting member 74 (the plate-shaped members 75, the annular member 98) is disposed so as to straddle over the liner 22 and the cap 26, and the connecting member 74 restricts relative rotation between the liner 22 and the cap 26.

In the above-described high pressure tank 10 or 10A, the connecting members 74 are arranged so as to straddle over the liner 22 and the cap 26, whereby the screwed-engaged state of the liner 22 and the cap 26 can be stably maintained. Consequently, in the high pressure tank 10 or 10A, it is possible to prevent the liner 22 and the cap 26 from being subjected to loosening or tightening, even if the cap 26 is supported and rotated to wind the reinforcing layer 24 when the reinforcing layer 24 is formed, and idle turning or the like of the cap 26 is not allowed to occur. As a result, it becomes possible to suitably form the reinforcing layer 24 on the outer surface of the liner 22 and the cap 26.

Further, the liner side recess 84 into which the connecting member 74 inserted is provided in the liner 22, whereas the cap side recess 86 connected to the liner side recess 84 and into which the connecting member 74 is inserted is provided in the cap 26. In accordance with this feature, in the high pressure tank 10 or 10A, at the time of manufacturing, the connecting members 74 can be easily arranged so as to straddle over the liner 22 and the cap 26. Further, by way of the liner side recesses 84 and the cap side recesses 86, it is possible to visually grasp whether or not the liner 22 and the cap 26 are shifted in position in the circumferential direction in the screw-engaged state, so that molding defects or the like in the members can be promptly discovered, whereby it becomes possible to improve product quality and yield.

Further, the thickness of the connecting member 74 is thinner than the depth of the liner side recess 84 and the depth of the cap side recess 86. In accordance with this feature, in the high pressure tank 10 or 10A, even if the connecting members 74 are inserted into the liner side recesses 84 and the cap side recesses 86, the connecting members 74 do not project out from the outer surface of the liner 22 or the outer surface of the cap 26. Therefore, the reinforcing layer 24 can be formed neatly on the outer surfaces 29 and 64, and an increase in size of the high pressure tank 10 or 10A can be prevented.

Further, the high pressure tank 10 further includes the engagement member 90 configured to engage with the cap 26 and the connecting member 74. In accordance with this feature, in the high pressure tank 10, the connecting members 74 can be reliably prevented from falling off from the cap 26.

Further, the engagement member 90 includes the head portion 90b hooked onto the connecting member 74 and covered with the reinforcing layer 24, and the shaft portion 90a connected to the head portion 90b and inserted into the hole 94 provided in the cap 26. In accordance with this feature, the head portions 90b of the engagement members 90 are pressed down by the reinforcing layer 24, whereby the connecting members 74 can be more firmly engaged.

Further, at least one of the cap 26 and the liner 22 includes the position indicating member 88 configured to indicate the joining position of the liner 22 and the cap 26. In accordance with this feature, in the high pressure tank 10 or 10A, it becomes possible for an operator to easily confirm whether or not the cap 26 is screw-engaged with respect to the liner 22 at a predetermined position.

Further, a plurality of the connecting members 74 (the plate-shaped members 75) are arranged along the circumferential direction of the liner 22 and the cap 26. In accordance with this feature, in the high pressure tank 10, it is possible to restrict rotation by the connecting members 74 at a plurality of locations in the circumferential direction of the liner 22 and the cap 26, and the screw-engaged state of the liner 22 and the cap 26 can be more stably maintained.

Further, the connecting member 74 (annular member 98) includes the ring member 104 arranged on one from among the liner 22 and the cap 26, and the plurality of protruding pieces 106 protruding from the ring member 104 to the other one of the liner 22 and the cap 26. In accordance with this feature, while the number of component parts is reduced, the high pressure tank 10A can restrict rotation by action of the connecting member 74 at a plurality of locations in the circumferential direction of the liner 22 and the cap 26.

Further, another aspect of the present invention is the method of manufacturing the high pressure tank 10 or 10A comprising the liner 22, the reinforcing layer 24 laminated on the outer surface of the liner 22, and the cap 26 joined to the liner 22 and having the flow path 72 through which a gas is configured to flow, the method of manufacturing the high pressure tank comprising the joining step of screw-engaging the liner 22 and the cap 26, the arrangement step of, after the joining step, arranging the connecting member 74 so as to straddle over the liner 22 and the cap 26, and the reinforcing layer formation step of, after the arrangement step, rotating the liner 22 and the cap 26 while supporting the cap 26, and forming the reinforcing layer 24 on the outer surface 29 of the liner 22 and the outer surface 64 of the cap 26. Accordingly, in the method of manufacturing the high pressure tank 10 or 10A, the connecting members 74 that are arranged in the arrangement step are capable of stably maintaining the screw-engaged state of the liner 22 and the cap 26, and the reinforcing layer 24 of the high pressure tank 10 or 10A can be suitably formed.

Further, the method of manufacturing the high pressure tank 10 or 10A further includes the engagement step, which is performed between the arrangement step and the reinforcing layer formation step, of placing the connecting member 74 and the cap 26 in engagement with each other. In accordance with this feature, in the method of manufacturing the high pressure tank 10, it becomes possible to reliably prevent the connecting members 74 from falling off from the liner 22 and the cap 26, and the reinforcing layer formation step can be performed in a stable manner.

What is claimed is:

1. A high pressure tank comprising:
   a liner;
   a reinforcing layer laminated on an outer surface of the liner; and
   a cap joined to the liner and having a flow path through which a gas is configured to flow;
   wherein
   the liner and the cap are joined to each other by screw-engagement and a connecting member,
   the cap comprises a flange portion protruding outwardly in a radial direction at an outer end of the cap where the cap is joined to the liner by the connecting member,
   the connecting member is inserted in a liner side recess formed in the liner and a cap side recess continuous from the liner side recess and formed in the flange portion,
   the connecting member is disposed along an outer surface of the liner and an outer surface of the flange portion so as to straddle over the liner and the flange portion, and
   the connecting member restricts relative rotation between the liner and the cap.

2. The high pressure tank according to claim 1, wherein a thickness of the connecting member is thinner than a depth of the liner side recess and a depth of the cap side recess.

3. The high pressure tank according to claim 1, further comprising an engagement member configured to engage with the cap and the connecting member.

4. The high pressure tank according to claim 3, wherein the engagement member comprises a head portion hooked onto the connecting member and covered with the reinforcing layer, and a shaft portion connected to the head portion and inserted into a hole provided in the cap.

5. The high pressure tank according to claim 1, wherein at least one of the cap and the liner includes a position indicating member configured to indicate a joining position of the liner and the cap.

6. The high pressure tank according to claim 1, wherein a plurality of the connecting members are arranged along a circumferential direction of the liner and the cap.

7. The high pressure tank according to claim 1, wherein the connecting member includes a ring member arranged on one from among the liner and the cap, and a plurality of protruding pieces protruding from the ring member to another one of the liner and the cap.

* * * * *